June 5, 1934.  K. FEHRMANN  1,961,660
HEAT EXCHANGE APPARATUS
Filed Jan. 5, 1933   3 Sheets-Sheet 1
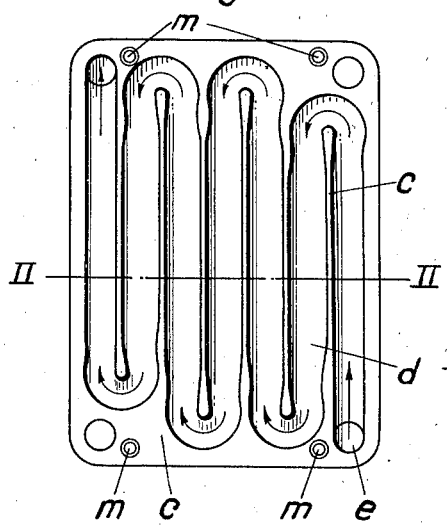
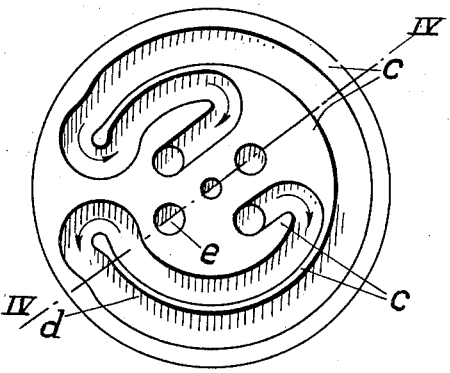
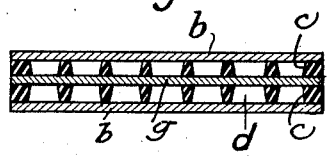
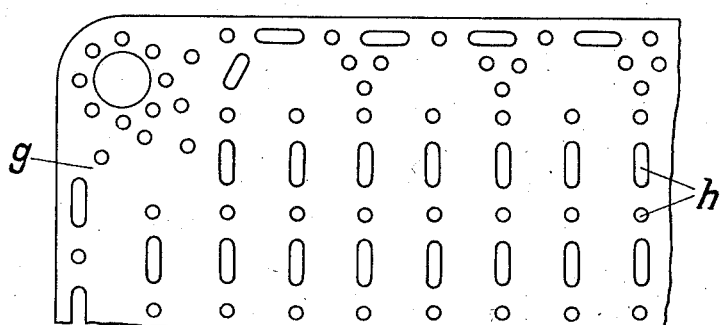
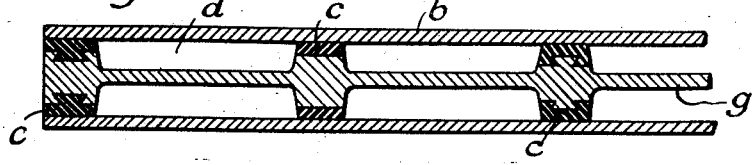

June 5, 1934.                K. FEHRMANN                    1,961,660
                        HEAT EXCHANGE APPARATUS
                        Filed Jan. 5, 1933          3 Sheets-Sheet 2

Inventor:
Karl Fehrmann
by S. Sokal,
Attorney.

June 5, 1934.                K. FEHRMANN                1,961,660
                         HEAT EXCHANGE APPARATUS
                          Filed Jan. 5, 1933          3 Sheets-Sheet 3

Inventor:
Karl Fehrmann
by S. Sonal,
    Attorney.

Patented June 5, 1934

1,961,660

UNITED STATES PATENT OFFICE 1,961,660

HEAT EXCHANGE APPARATUS

Karl Fehrmann, Dortmund, Germany

Application January 5, 1933, Serial No. 650,354
In Germany January 7, 1932

8 Claims. (Cl. 257—245)

I have filed applications in Germany on the 7th January, 1932; 5th and 6th February, 1932; 27th July, 1932; and 1st August, 1932; and in Great Britain on the 31st October, 1932.

The invention relates to apparatus of the plate type for the heating and cooling of liquids such as milk, wort, beer and the like.

In apparatus of this type alternate ribbed plates and smooth cover plates are so pressed against each other as to produce between the plates conduits for the passage of a fluid.

The object of the invention is to provide an improved construction of such heat exchange apparatus which consists in the combination of a base plate, a continuous, seamless, sinuously slotted layer of resilient material, and a cover plate, the slotted resilient material together with the two plates forming conduits for the passage of a fluid. The improved construction enables conduits of a very smooth flow-line to be produced in a cheap and very effective manner.

The accompanying drawings show by way of example several constructions embodying the features of the invention.

Figs. 1 and 2 show the first construction, Fig. 1 is a top view of the ribbed plate and Fig. 2 is a cross section on line II—II of Fig. 1.

Figs. 3 and 4 show the second construction, Fig. 3 being a top view of the ribbed plate and Fig. 4 a cross section of the ribbed plate and two cover plates on line IV—IV of Fig. 3.

Fig. 5 shows the third construction in cross section.

Fig. 6 shows in plan a base plate formed with holes.

Fig. 11 is a top view of a ribbed plate provided at the periphery with a distance member.

Fig. 12 is a cross section corresponding to Fig. 11 showing several plates and distance pieces.

Fig. 13 is a partial section on line XIII—XIII of Fig. 11.

Referring first to Figs. 1 and 2, the ribbed plate consists, according to the invention, of a base plate $g$ upon each side of which is applied a continuous, seamless sinuously-slotted layer or sheet $c$ of yielding material which forms the ribs or protuberances and laterally bounds and tightly closes the flow conduits $d$. The layer to be applied consists preferably of rubber, but soft metal, for instance lead, is also suitable. The rubber layer may, in all cases, be vulcanized to the base plate. In order that the applied layer should have a good mechanical connection with the base plate $g$, it may, according to Figs. 6 to 10, be connected thereto by special means. $e$ indicates an inlet or outlet opening. $b$, $b$ are smooth cover plates.

The construction shown in Figs. 3 and 4 differs from that shown in Figs. 1 and 2, in that the plates are circular and the flow conduits $d$ are a different shape.

Figure 7:
Fig. 7 shows in cross section a fourth construction in which resilient layer materials on both sides of a base plate are connected by casting or moulding.

According to Figs. 6 and 7, the base disc $g$ is provided at a certain distance with circular or elongated holes $h$ which are filled with layer material, for instance, by casting or moulding the layer $c$, so that the ribs formed on both sides are well connected together. By this means, the lateral thrust of the liquid, particularly against the rib-like protuberances at the outer edge is securely taken up.

Figure 8:
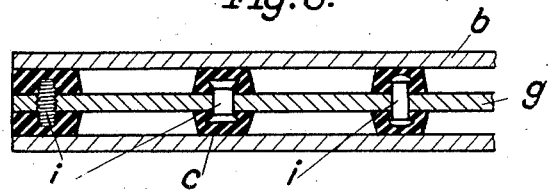
Fig. 8 shows in cross section a further construction in which the base plate is provided with screws or rivets.

According to Fig. 8, the base disc $g$ is provided with screws or rivets $i$, the bead-like heads of the rivets being embedded in the applied layer.

Figure 9:
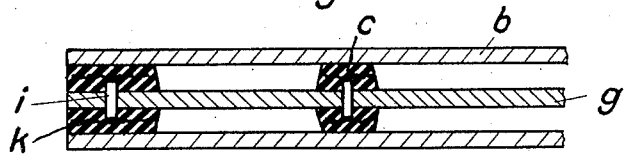
Fig. 9 shows in cross section a construction in which the resilient layer is reinforced by sieve-like wire.

In Fig. 9 the layer $c$ is reinforced by sieve-like wire insertions $k$ which are themselves connected with the base disc $g$ by pins $i$.

The intimate connection of the layer with the base disc $g$ as shown by way of example in Figs. 6 to 9, also enables the layer to be applied on one side only of the base if required. Plates having one-sided layers may be used without intervening or cover plates $b$, whilst plates having a double layer must be separated by a smooth separating plate $b$.

If a plate made of soft metal is used as the resilient layer, it may be connected with the base disc in known manner by soldering, welding, riveting or screwing.

The continuous layer enables very favourable flow conduits to be obtained, as, for instance, shown in Figs. 1 and 3 in connection with plates of rectangular and circular shape.

If particularly deep flow conduits are required, they may be partly let into the base disc $g$ so that the layer $c$ of yielding material forms only a covering and smoothing layer upon the projecting portions of the base disc $g$, as shown in Fig. 5.

With heat exchange apparatus of the kind according to the invention, it is necessary to limit the degree of compression of the resilient layer or layers $c$. If the degree of compression were not limited unskilled manipulation or fitting of the apparatus might result in the conduits $d$ becoming too narrow or having different cross sections upon different sides of the plates owing to excessive or non-uniform compression of the individual layers.

In order to avoid this drawback, the degree of compression of the yielding layer of the ribbed plates according to the invention, is limited by providing between the individual plates solid distance members. Ribbed plates provided with such distance members are shown in Figs. 10 to 13.

Figure 10:
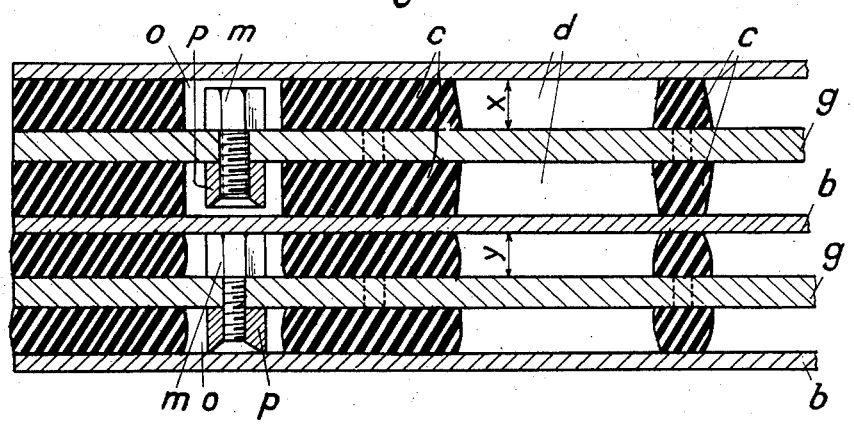
Fig. 10 shows in cross section a further construction in which distance bolts are located in recesses of the resilient layer.

Fig. 10 shows two ribbed plates c, g, c co-operating on both sides with smooth separating or cover plates b. The upper ribbed plate, according to Fig. 10, is shown in the position which the plate assumes upon the smooth separating plates b being applied loosely to the resilient layers applied to the base disc g. The lower ribbed plate is shown in the position corresponding to the smooth plates b being pressed against the ribbed plate.

It will be seen that the vertical dimension $x$ of the conduit $d$ is reduced to $y$ upon a sufficient pressure being exerted upon the ribbed plate, the measure of reduction being proportionate to the pressure used.

According to Fig. 10, distance members or bolts $m$ are fixed to the solid base plate $g$ of the ribbed plate either by screwing or riveting into a sleeve $p$. The distance bolts are located in recesses $o$ of the resilient layer $c$. Upon the plates being pressed together, the vertical dimension of the conduit $d$ cannot be reduced to less than the magnitude $y$, the actual reduction depending upon the force of compression used. It will thus be seen that the compression is limited by the height of the bolt $m$ or the sleeve $p$. Obviously, the compression of the resilient layers $c$ must be sufficient to insure tightness relatively to the smooth separating plates b. Consequently the height of the distance member must be suitably dimensioned having regard to the nature of the resilient layer. This condition can be easily fulfilled even with varying operating conditions, by providing distance bolts of different heights which can be easily exchanged. In Fig. 10 the lower distance bolt $m$ is riveted to the sleeve $p$, whilst the upper distance bolt $m$ is screwed into the sleeve $p$. The latter construction provides for easy exchange in case of need. Another point to be taken into account is the fact that the edges of the resilient layer $c$ must have sufficient room to expand laterally upon compression. Other means for determining the distance of the separating plates or the compression of the resilient layer may, of course, be used. It is not essential that the distance members be fixed to the base disc or plate $g$ of the ribbed plate. They may, if preferred, be connected to the covering or separating plates b at suitable points. The distance members should be distributed in such numbers and in such a manner upon the plates as to insure a uniform distance of the plates from each other upon a certain maximum pressure being attained.

The invention is also applicable to plates which are provided on one side only with a resilient layer and are smooth upon the other side. In this case separate cover plates are not required at all, inasmuch as the base of one ribbed plate forms at the same time the cover of the adjacent plate. Consequently the apparatus may be made up of plates ribbed on one side only following each other directly.

Figure 12:
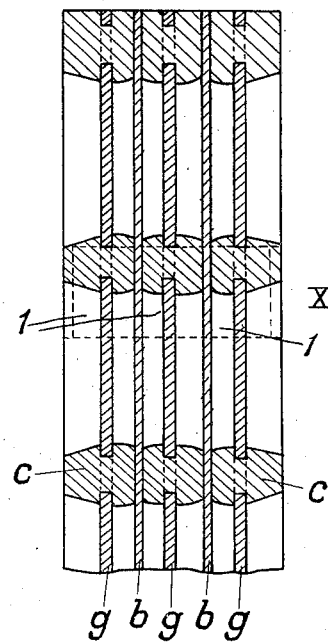
Figs. 11 to 13 show a further construction.
Figure 11:
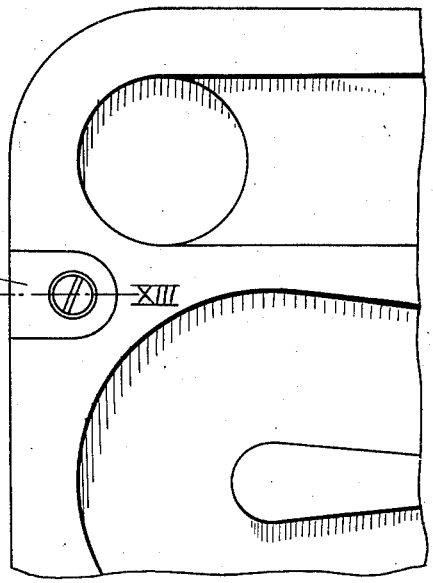
Figure 13:
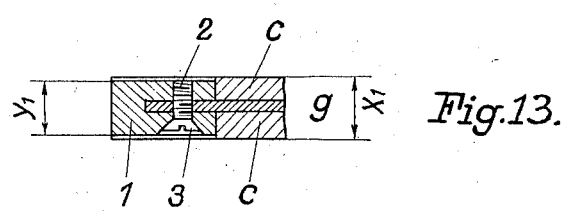

A further construction of a distance member is shown in Figs. 11 to 13. Fig. 11 shows a corner piece of a ribbed plate with a modified distance member 1 in plan. Fig. 12 shows three such ribbed plates $g$ with two interposed smooth plates b, the central plate and the inner sides of the two outer plates being shown in compressed condition, whilst the outer sides of the outer plates are shown in uncompressed condition.

Fig. 13 shows the distance piece in section, in the position it assumes when slid upon the solid base plate $g$. The base plate $g$ is covered with the resilient layer $c$ which is provided at any desired number of points of its periphery with recesses which are so shaped as to enable clamp-like distance pieces 1 to be slid over the base plate $g$ to fit the recesses. In order to fix the distance members to the base plate $g$, the distance members are provided with a threaded bore 2 into which a screw 3 may be inserted. The base plate $g$ is at this point suitably perforated. The thickness $y_1$ of the distance piece 1 is made slightly less than the thickness $x_1$ of the plate and applied layers, the difference between $x_1$ and $y_1$ corresponding to the magnitude of the required compression of the resilient layers. This very simple construction of the distance members makes rapid exchange of the members very easy should, after long use of the plates, the necessity arise to increase the measure of compression of the resilient layer. In that case it is only necessary to remove the screw 3 in order to take off the distance piece 1 from the base plate $g$. In some cases it is sufficient to reduce the thickness of the distance piece 1 by a few strokes with a file in order to obtain the necessary adjustment and it is therefore not even necessary to substitute a new distance piece.

I claim:

1. In heat exchange apparatus of the plate type, the combination of: a base plate; a continuous, seamless sinuously-slotted layer of resilient material; and a cover plate, the resilient material together with the two plates forming conduits for the passage of a fluid, substantially as described.

2. In heat exchange apparatus of the plate type, the combination of: a base plate; a continuous, seamless sinuously-slotted layer of resilient material secured to said base plate; and a cover plate, the resilient material together with the two plates forming conduits for the passage of a fluid, substantially as described.

3. In heat exchange apparatus of the plate type, the combination of: a base plate; a continuous, seamless sinuously-slotted layer of resilient material; a cover plate; said base plate having holes and said resilient layer having projections engaging said holes, the resilient material together with the two plates forming conduits for the passage of a fluid, substantially as described.

4. In heat exchange apparatus of the plate type, the combination of: a base plate; a continuous, seamless sinuously-slotted layer of resilient material; a cover plate, said base plate and said resilient layer being connected by members pinned into the base plate, the resilient material together with the two plates forming conduits for the passage of a fluid, substantially as described.

5. In heat exchange apparatus of the plate type, the combination of: a base plate; a continuous, seamless sinuously-slotted layer of resilient material; a cover plate, said resilient layer being reinforced by metal insertions, said insertions being secured by means of pins, the resilient material together with the two plates forming conduits for the passage of a fluid, substantially as described.

6. In heat exchange apparatus of the plate type, the combination of: a base plate; a continuous, seamless sinuously-slotted layer of resilient material; a cover plate; and distance members limiting the compression of the resilient layer upon assembly, the resilient material together with the two plates forming conduits for the passage of a fluid, substantially as described.

7. In heat exchange apparatus of the plate type, the combination of: a base plate; a continuous, seamless sinuously-slotted layer of resilient material; a cover plate; and distance members limiting the compression of the resilient layer upon assembly, said distance members comprising cylindrical bolts with sleeves, the resilient material together with the two plates forming conduits for the passage of a fluid, substantially as described.

8. In heat exchange apparatus of the plate type, the combination of: a base plate; a continuous, seamless sinuously-slotted layer of resilient material; a cover plate; and distance members limiting the compression of the resilient layer upon assembly, said distance members being made in the form of clamps, the resilient material together with the two plates forming conduits for the passage of a fluid, substantially as described.

KARL FEHRMANN.